United States Patent
Zhao et al.

(10) Patent No.: US 10,820,653 B2
(45) Date of Patent: Nov. 3, 2020

(54) SMART HAT, METHOD AND DEVICE FOR CONTROLLING SMART HAT

(71) Applicant: Beijing Xiaomi Mobile Software Co., Ltd., Haidian District, Beijing (CN)

(72) Inventors: Yonghui Zhao, Beijing (CN); Haibin Weng, Beijing (CN); Xin Shi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 637 days.

(21) Appl. No.: 15/495,996

(22) Filed: Apr. 25, 2017

(65) Prior Publication Data
US 2018/0055125 A1    Mar. 1, 2018

(30) Foreign Application Priority Data
Aug. 30, 2016    (CN) .......................... 2016 1 0772633

(51) Int. Cl.
| A42B 1/06 | (2006.01) |
| A42B 3/22 | (2006.01) |
| A42B 1/24 | (2006.01) |
| G05B 15/02 | (2006.01) |

(52) U.S. Cl.
CPC .............. *A42B 1/064* (2013.01); *A42B 1/242* (2013.01); *A42B 1/245* (2013.01); *A42B 3/224* (2013.01); *A42B 3/227* (2013.01); *G05B 15/02* (2013.01)

(58) Field of Classification Search
CPC ......... A42B 1/064; A42B 1/242; A42B 1/245; A42B 3/224; A42B 3/227; G05B 15/02
See application file for complete search history.

(56) References Cited

U.S. PATENT DOCUMENTS

| 4,918,759 A * | 4/1990 | Anderson | .............. A42B 1/242 |
| | | | 2/209.13 |
| 6,457,180 B1 | 10/2002 | Jung | |
| 2004/0128737 A1* | 7/2004 | Gesten | ................... A42B 1/245 |
| | | | 2/171 |
| 2010/0313334 A1* | 12/2010 | Moy | ...................... A42B 1/248 |
| | | | 2/209.13 |

(Continued)

FOREIGN PATENT DOCUMENTS

| CH | 710031 A1 | 2/2016 |
| CN | 1487801 A | 4/2004 |
| CN | 103284377 A | 9/2013 |

(Continued)

OTHER PUBLICATIONS

Translation of CN205432295, Aug. 10, 2016, by Hu, Jiewen.*

(Continued)

*Primary Examiner* — Khaled Annis
(74) *Attorney, Agent, or Firm* — Jun He Law Offices P.C.; James J. Zhu

(57) ABSTRACT

A smart hat, a method and device for controlling the smart hat are provided. The smart hat includes a brim, and the method includes: acquiring configuration reference information of the brim, and the configuration reference information includes: attitude information of the brim and sunlight irradiation information; acquiring setting parameters according to the configuration reference information; reconfiguring the attitude of the brim according to the setting parameters.

13 Claims, 4 Drawing Sheets

(56) References Cited

U.S. PATENT DOCUMENTS

2011/0283431 A1 11/2011 Miller, IV et al.
2014/0225812 A1* 8/2014 Hosoya ................ G02B 27/017
　　　　　　　　　　　　　　　　　　　345/8

FOREIGN PATENT DOCUMENTS

| CN | 204157738 U | 2/2015 |
| CN | 104665055 A | 6/2015 |
| CN | 105124842 A | 12/2015 |
| CN | 205040716 U | 2/2016 |
| CN | 205432295 U | 8/2016 |
| DE | 9401066 U1 | 4/1994 |

OTHER PUBLICATIONS

First Office Action in Chinese application No. 201610772633.3, dated Nov. 1, 2018.
Extended Search Report of EP Application No. 17156773.8 dated Aug. 21, 2017.

* cited by examiner

SMART HAT, METHOD AND DEVICE FOR CONTROLLING SMART HAT

CROSS-REFERENCE TO RELATED APPLICATION

This application is based on and claims priority to Chinese Patent Application No. 201610772633.3, filed Aug. 30, 2016, which is incorporated herein by reference in its entirety.

TECHNICAL FIELD

The present disclosure relates to the field of wearable device technology, and more particularly to a smart hat, a method and device for controlling the smart hat.

BACKGROUND

Hats are necessities for daily living, and most hats are generally provided with a brim for sunlight shielding.

Typically, a user can only manually adjust the position of a brim to prevent himself from exposure to direct sunlight, which is relatively inconvenient. For example, if a user running bicycle manually adjusts the position of his brim, this action may lead to a safety risk.

SUMMARY

According to a first aspect of embodiments in the present disclosure, a method for controlling a smart hat is provided. The smart hat includes a brim, and the method includes: acquiring configuration reference information of the brim, and the configuration reference information includes: attitude information of the brim and sunlight irradiation information; acquiring a setting parameter for the brim according to the configuration reference information; reconfiguring attitude of the brim according to the setting parameter.

According to a second aspect of embodiments in the present disclosure, a device for controlling a smart hat is provided. The smart hat includes a brim and the device includes: a processor; a storage for storing instructions executable by the processor; wherein, the processor is configured to: acquire configuration reference information of the brim, and the configuration reference information includes: attitude information of the brim and sunlight irradiation information; acquire setting parameter for the brim according to the configuration reference information; and reconfigure the attitude of the brim according to the setting parameter.

According to a third aspect of embodiments in the present disclosure, a smart hat is provided. The smart hat includes: a hat body, a brim movably connected with the hat body; an actuator connected with the brim; and a processor configured to control the actuator to adjust attitude of the brim.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

Figure 1A:
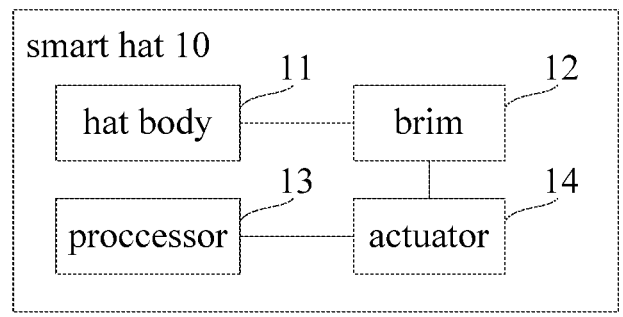
FIG. 1A is a block diagram illustrating structure of a smart hat according to an exemplary embodiment.

FIG. 1A is a block diagram illustrating the structure of a smart hat according to an exemplary embodiment. The smart hat 10 includes a hat body 11, a brim 12, a processor 13 and an actuator 14.

The smart hat 10 provided by the embodiments of the present disclosure includes a brim 12, and the brim 12 is most often used for sunlight shielding. For example, a baseball cap, a sunhat, a peaked cap, and an army hat are all equipped with a brim. The embodiments of the present disclosure do not limit the shape and the material of the brim 12 of the smart cap 11.

Typically, the brim is generally in fixed connection with the hat body. According to the smart hat 10 in the embodiments of the present disclosure, the brim 12 is movably connected with the hat body 11. For example, the brim 12 may be rotatable in a pitch direction and/or in a horizontal direction.

Figure 1B:
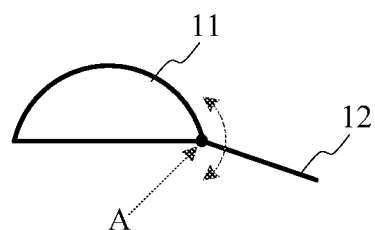
FIG. 1B is a side view illustrating a smart hat according to an exemplary embodiment.

In an example, referring to FIG. 1B, which illustrates a side view of a smart hat 10, the brim 12 has connection parts on both sides of the brim 12, and the hat body 11 has two fixing parts on both sides of the hat body 11, which are corresponding to the respective connection parts. The connection parts are in movable connection with the fixing parts, respectively. The brim 12 can be rotated about an axis formed by the movable connection points (for example, point A as shown in FIG. 1B) in a pitch direction.

Figure 1C:
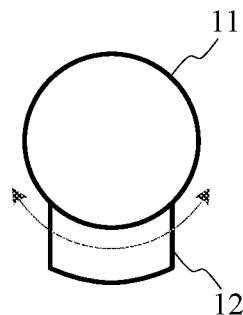
FIG. 1C is a top view illustrating a smart hat according to an exemplary embodiment.

In another example, referring to FIG. 1C, which illustrates a top view of a smart hat 10, the hat body 11 has a sliding member on its peripheral part. The hat body 11 has two fixing parts on its two sides, which are located on the sliding member respectively and movably connected with the sliding member. The brim 12 can be moved along the sliding member in a plane of the brim. For example, the sliding member may be a strip-shaped sliding groove, and the fixing parts are engaged in the sliding groove and slidable along the sliding groove such that the brim 12 can be rotated in a plane of the brim 12 (generally in a horizontal direction).

The actuator 14 is connected with the brim 12 and is electrically connected with the processor 13. The actuator 14 is configured to adjust attitude of the brim 12 under control of the processor 13. For example, pitch attitude and/or horizontal attitude of the brim 12 can be adjusted. The processor 13 is configured to control the actuator 14 to adjust the attitude of the brim 12. The processor 13 may also be a controller.

Figure 1D:
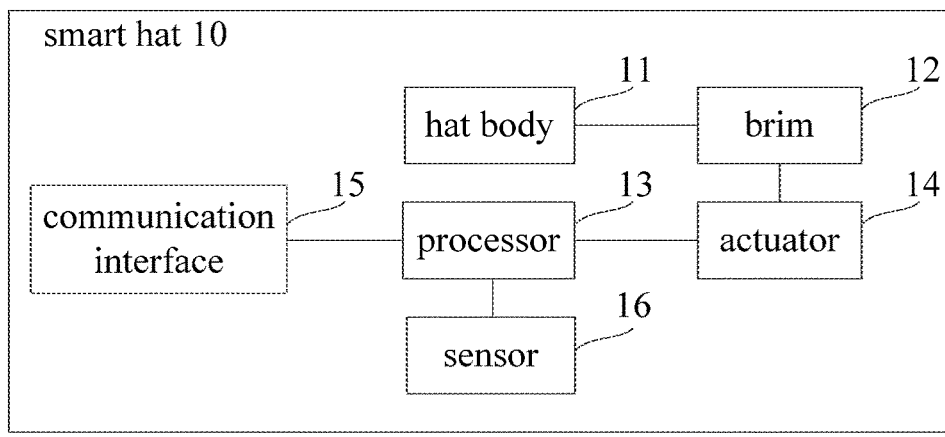
FIG. 1D is a block diagram illustrating structure of a smart hat according to another exemplary embodiment.

Additionally, as shown in FIG. 1D, the smart hat may further include: a communication interface 15 that is electrically connected with the processor 13. The communication interface 15 is configured to establish a communication connection with an external device, and exchange information with the external device through the communication connection. For example, an external device may be a mobile terminal such as a mobile phone, a tablet computer, a multimedia playback device, a PDA (Personal Digital Assistant), or a wearable device. The smart hat 10 exchanges information with the external device through the communication connection The communication connection may be a wireless network connection, for example, a wireless network connection established by using Bluetooth, ZigBee or Near Field Communication (NFC) technology. In other possible embodiments, the communication connection may also be established by using infrared technology or the like.

Additionally, as shown in FIG. 1D, the smart hat may further include: a sensor 16 that is electrically connected with the processor 13. The sensor 16 may include, but is not limited to, at least one of the following items: a positioning sensor, a photosensor, and a geomagnetism sensor. The positioning sensor is configured to acquire current geographical location; the photosensor is configured to acquire sunlight irradiation angle and/or sunlight irradiation intensity; and the geomagnetism sensor is configured to acquire a user's attitude and/or attitude information of the brim.

Figure 2A:
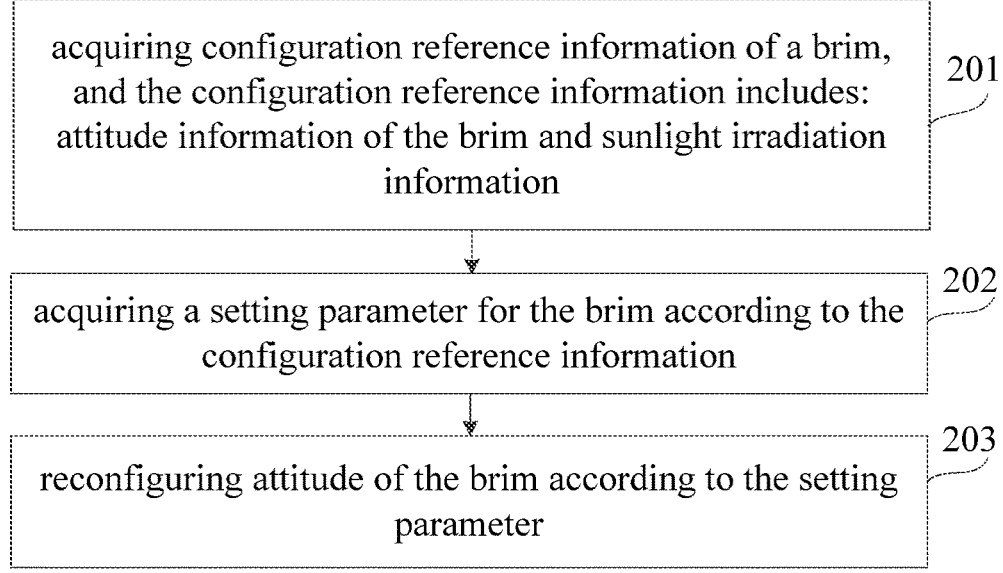
FIG. 2A is a flowchart illustrating a method of controlling a smart hat according to an exemplary embodiment.

FIG. 2A is a flowchart illustrating a method of controlling a smart hat according to an exemplary embodiment. The present embodiment is illustrated by applying the method to a smart hat. The method includes the following steps.

In step 201, configuration reference information of a brim of a smart hat is acquired. The configuration reference information may include attitude information of the brim of the smart hat and sunlight irradiation information.

The attitude information of the brim indicates current attitude of the brim. As described above, the brim can be rotated in a pitch direction and/or in a horizontal direction. Accordingly, the attitude information of the brim may include at least one of the following items: pitch attitude information and horizontal attitude information. The pitch attitude information indicates the current pitch attitude of the brim, such as the orientation or angle in pitch direction. The horizontal attitude information indicates current horizontal attitude of the brim, such as the orientation or angle in horizontal direction. The smart hat may acquire the attitude information of the brim by using a geomagnetic sensor.

The sunlight irradiation information indicates current state of the sun. The sunlight irradiation information may include at least one of the following items: sunlight irradiation angle, sunlight irradiation intensity, sun's position. The sunlight radiation angle indicates an angle about the sunlight rays, such as solar elevation angle. The solar elevation angle refers to an angle between incident direction of the sunlight rays and the horizontal plane. The solar elevation angle at a certain geographic point refers to an angle between the sunlight rays and a tangent plane of the earth's surface perpendicular to a line passing through the point and the earth's core. The sunlight radiation intensity indicates an irradiation intensity of the sunlight rays. The sun's position indicates a position of a point where the sun is located.

In an example, acquiring sunlight radiation information includes the following substeps: acquiring current geographical location and current time, and acquiring sunlight irradiation information according to the current geographical location and the current time. The current geographical location may be acquired by using a related positioning technology, such as GPS (Global Positioning System technology). For example, the smart hat may acquire its current geographic position by using a positioning sensor. By acquiring the solar elevation angle as an example, it may include the following steps.

1. The solar elevation angle $e_0$ without consideration of atmospheric refraction is calculated according to the following formula:

$$e_0 = \text{Arcsin}(\sin\varphi \times \sin\delta' + \cos\varphi \times \cos\delta' \times \cos H')$$

wherein $\varphi$ denotes latitude of the current geographical location, $\delta'$ denotes the sun's declination angle of the current geographical location at the current time, and $H'$ denotes the solar hour angle of the current geographical location at the current time;

2. Correction value $\Delta e$ of the solar elevation angle $e_0$ with regard to the atmospheric refraction is calculated according to the following formula:

$$\Delta e = \frac{P}{1010} \times \frac{283}{273+T} \times \frac{102}{60 \times \tan\left(e_0 + \frac{10.3}{e_0 + 5.11}\right)}$$

wherein P denotes the annual average pressure of the current geographical location, T denotes the annual average temperature of the current geographical location.

3. The solar elevation angle $e_0$ with regard to the atmospheric refraction is calculated according to the following formula:

$$e = e_0 + \Delta e.$$

In this way, the effect of atmospheric refraction on the solar elevation angle is considered, which ensures more accurate calculation result for solar elevation angle, thereby a higher accuracy of the subsequent brim adjustment can be achieved.

In addition, the smart hat can also acquire the sunlight irradiation angle and/or sunlight irradiation intensity through a photosensor.

Additionally or alternatively, the method further includes acquisition of current weather condition before step 201. For example, the smart hat may request the current weather condition from a mobile terminal or a cloud server. The current weather condition indicates weather condition of current location of the smart hat at current moment. For example, the current weather condition may be sunny, cloudy, rainy or foggy, etc. It is checked whether the current weather condition meets a preset condition after the current weather condition is acquired. The preset condition is a preset weather condition under which a brim is required for sunlight shielding. For example, the preset condition may be that the current weather condition is sunny. In another example, the preset condition may be that the current weather condition is sunny and the light is strong, such as sunny and cloudy weather. In case that the current weather condition matches the preset condition, step 201 is performed. Otherwise, in case that the current weather condition does not match the preset condition, then adjustment of the brim is not required.

Additionally or alternatively, in case that sunlight irradiation information includes sunlight irradiation intensity, whether the sunlight irradiation intensity is greater than a preset threshold value is detected upon acquisition of the sunlight irradiation intensity. If the sunlight irradiation intensity is greater than the preset threshold value, then the step 202 is performed. Otherwise, if the sunlight irradiation intensity is less than the preset threshold value, then the process is ended. By this way, the attitude of the brim can be adjusted automatically to achieve sunlight shielding under a more intense light condition, while no adjustment is required under a weaker light condition.

In step 202, setting parameter can be acquired according to the configuration reference information.

The setting parameter is configured to set the attitude of the brim. The setting parameter may include at least one of the following items: a pitch attitude parameter and a horizontal attitude parameter. The pitch attitude parameter is used for setting the pitch attitude of the brim, i.e. the orientation or angle of the brim in pitch direction. The horizontal attitude parameter is used for setting the horizontal attitude of the brim, i.e. the orientation or angle of the brim in horizontal direction.

Additionally or alternatively, the pitch attitude parameter may include at least one of the following items: a pitch direction parameter and a pitch angle parameter. The pitch direction parameter indicates an adjustment direction of the brim in pitch direction. The pitch angle parameter indicates an adjustment angle of the brim in pitch direction. Additionally, the pitch attitude parameter may also include target pitch attitude information for indicating pitch attitude after reconfiguration of the brim, such as the orientation or angle in pitch direction after reconfiguration.

Additionally or alternatively, the horizontal attitude parameter may include at least one of the following items: a horizontal direction parameter and a horizontal angle parameter. The horizontal direction parameter indicates an adjustment direction of the brim in horizontal direction. The horizontal angle parameter indicates an adjustment angle of the brim in horizontal direction. Additionally or alternatively, the horizontal attitude parameter may also include target horizontal attitude information for indicating horizontal attitude after reconfiguration of the brim, such as the orientation or angle in horizontal direction after reconfiguration.

Figure 2B:
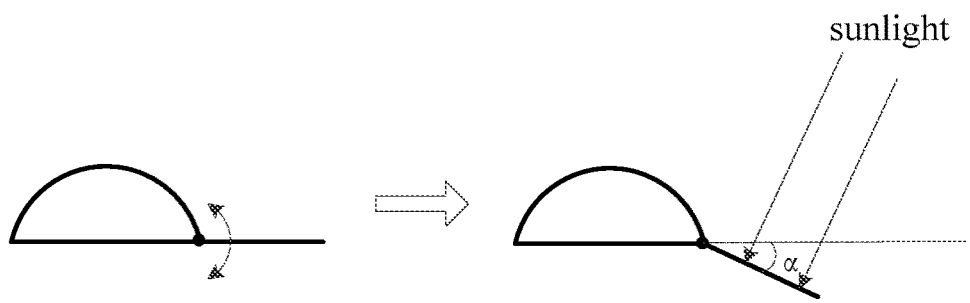
FIG. 2B is a schematic diagram of adjustment of a brim involved in the embodiment shown in FIG. 2A.

In an example, step 202 may include the following substeps: determining target attitude of the brim after reconfiguration according to the configuration reference information; determining setting parameter for the brim according to the target attitude. The target attitude may include target pitch attitude and/or target horizontal attitude. The target pitch attitude refers to a new attitude in pitch direction after the reconfiguration of the attitude of the brim, and the target horizontal attitude refers to a new attitude in horizontal direction after the reconfiguration of the attitude of the brim. Both the reconfiguration of the pitch attitude of the brim and the reconfiguration of the horizontal attitude of the brim are based on the following principle: the attitude of the brim is reconfigured such that an angle between a plane of the brim and the incident sunlight is in a vertical state or in a nearly vertical state. The vertical state refers to the angle between the plane on which the brim rests and the incident sunlight is 90 degree. The nearly vertical state refers to the angle between the plane on which the brim rests and the incident sunlight is almost 90 degree, for example, the angle is between 80 and 90 degree. For example, as shown in FIG. 2B, by reconfiguring the pitch attitude of the brim as an example, the current pitch attitude of the brim is parallel to the horizontal plane (as shown on the left side of FIG. 2B), and current incident sunlight is as shown on the right side of FIG. 2B. By turning down the brim by a such that the angle between the plane of the brim and the incident sunlight become 90 degree, the effect of sunlight shielding can be improved.

In step 203, the attitude of the brim is reconfigured according to the setting parameter.

In an example, the setting parameter may include a pitch attitude parameter. Step 203 may include: reconfiguring the pitch attitude of the brim according to the pitch attitude parameter. In the case where the pitch attitude parameter includes the pitch direction parameter and the pitch angle parameter, the smart hat determines adjustment direction of the brim in pitch direction according to the pitch direction parameter, and determines adjustment angle of the brim in pitch direction according to the pitch angle parameter, then turns in pitch direction the brim by the adjustment angle along the adjustment direction. In the case where the pitch attitude parameter includes target pitch attitude, the adjustment direction and the adjustment angle of the brim in pitch direction are determined according to the current pitch attitude and the target pitch attitude of the brim, and then turns in pitch direction the brim by the adjustment angle along the adjustment direction. Additionally or alternatively, the pitch attitude of the brim is reconfigured such that an angle between the plane of the brim and incident sunlight is within a first preset interval [90°−a, 90°], wherein 0≤a<90°. For example, the preset interval may be [80°, 90°].

In another example, the setting parameter may include a horizontal attitude parameter. Step 203 may include: reconfiguring the horizontal attitude of the brim according to the horizontal attitude parameter. In the case where the horizontal attitude parameter includes the horizontal direction parameter and the horizontal angle parameter, the smart hat determines the adjustment direction of the brim in horizontal direction according to the horizontal direction parameter, and determines the adjustment angle of the brim in horizontal direction according to the horizontal angle parameter, then turns in horizontal direction the brim by the adjustment angle along the adjustment direction. In the case where the horizontal attitude parameter includes target horizontal attitude, the adjustment direction and the adjustment angle of the brim in horizontal direction can be determined according to the current horizontal attitude and the target horizontal attitude of the brim, and in horizontal direction the brim is turned by the adjustment angle along the adjustment direction. Additionally or alternatively, the horizontal attitude of the brim is reconfigured such that an angle between the plane of the brim and incident sunlight is within a second preset interval [90°−b, 90°], wherein 0≤b<90°. For example, second preset interval may be [80°, 90°].

Additionally, the configuration reference information may further include: a user's attitude. The user's attitude indicates current attitude of the user's head. For example, the pitch attitude and/or the horizontal attitude of the user's head. The smart hat may acquire the user's attitude by using a geomagnetic sensor. The setting parameter may be acquired by considering the attitude information of the brim, the sunlight irradiation information and the user's attitude. The attitude of the brim is reconfigured such that the brim shields a target area of the user from the incident sunlight. The target area may include a combination of one or more of the following items: forehead, eyes, nose, mouth, ears, cheek, and neck. The target area may be set in advance, for example, predefined by a user.

In addition, when the method provided in present embodiment is performed by the smart hat, the smart hat may acquire the configuration reference information of the brim by using one or more sensors, and then acquire the setting parameter for the brim by using a processor according to the configuration reference information, and reconfigure the attitude of the brim by using the actuator under control of the processor according to the setting parameter.

The method provided in present embodiment, by acquiring configuration reference information of a brim of a smart hat, acquiring setting parameters according to the configuration reference information and reconfiguring the attitude of the brim according to the setting parameters, enables convenience for a user with no need to manually adjust the position of a brim, and furthermore, enables automatic adjustment of the attitude of a brim and consideration of sunlight irradiation information during reconfiguration of the attitude of the brim, and thereby achieves an effect that the attitude of a brim can be adjusted automatically for sunlight shielding.

In addition, by adjusting the brim so that it becomes perpendicular to or nearly perpendicular to the incident sunlight, better effect of sunlight shielding can be achieved.

In addition, by acquiring the setting parameter for the brim by considering the user's attitude, it is possible to shield a target area of the user effectively, thereby attain desired and needed effect of sunlight shielding.

Figure 3:
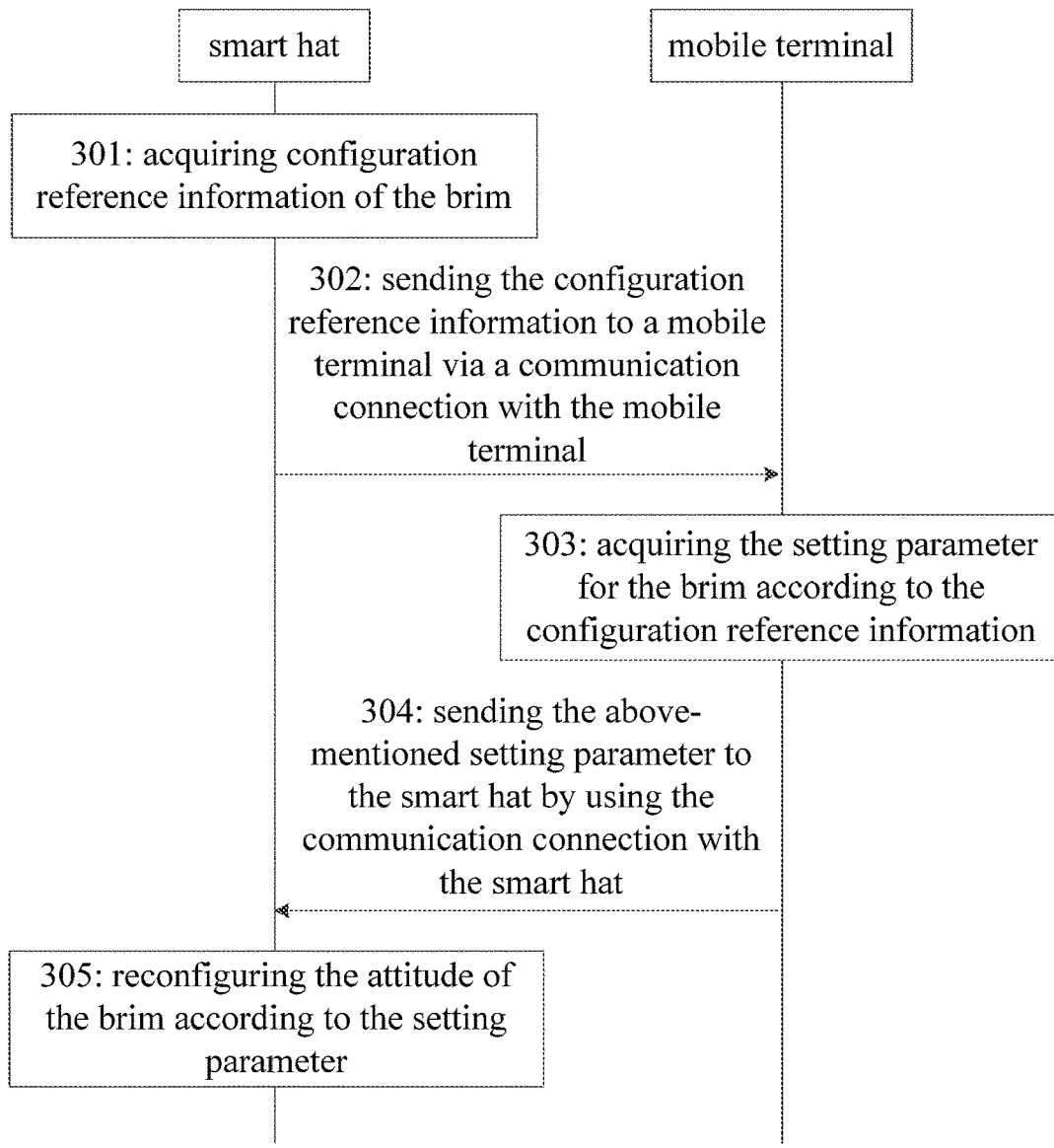
FIG. 3 is a flowchart illustrating a method of controlling a smart hat according to yet another exemplary embodiment.

FIG. 3 is a flowchart illustrating a method of controlling a smart hat according to another exemplary embodiment. The method includes the following steps.

In step 301, the smart hat acquires configuration reference information of its brim.

In step 302, the smart hat sends the configuration reference information to a mobile terminal via a communication connection with the mobile terminal.

The communication connection with the mobile terminal may be implemented by using the above discussed wireless approaches. In an example, the smart hat sends location information of the brim to the mobile terminal via Bluetooth.

The configuration reference information, which is sent by the smart hat to the mobile terminal, may include at least attitude information of the brim on the smart hat. Additionally, the configuration reference information may also include at least one of the following items: sunlight irradiation information and a user's attitude. Each item of the configuration reference information may be referred to the discussion and description in the embodiment shown in FIG. 2A, which will not be described redundantly. Accordingly, the mobile terminal receives the configuration reference information sent by the smart hat.

In step 303, the mobile terminal acquires the setting parameter for the brim according to the configuration reference information.

It should be noted that the sunlight irradiation information may be acquired by the smart hat and sent to the mobile terminal, or acquired by the mobile terminal, or acquired by both the smart hat and the mobile terminal. For example, the smart hat may acquire sunlight irradiation intensity by using a photosensor and send it to the mobile terminal, and the mobile terminal may acquire sunlight irradiation angle or sun's position information such as the sun's declination angle. The description of step 303 may be referred to the discussion and description of step 202 in the embodiment shown in FIG. 2A, which will not be described redundantly.

In step 304, the mobile terminal sends the above-mentioned setting parameter to the smart hat by using the communication connection with the smart hat. Accordingly, the smart hat receives the setting parameter sent by the mobile terminal.

In step 305, the smart hat reconfigures the attitude of the brim according to the setting parameter.

The description of step 305 may be referred to the discussion and description of step 203 in the embodiment shown in FIG. 2A, which will not be described redundantly.

The method provided in present embodiment, by acquiring configuration reference information of a brim of a smart hat, acquiring setting parameters according to the configuration reference information and reconfiguring the attitude of the brim according to the setting parameters, enables convenience for a user with no need to manually adjust the position of a brim, and furthermore, enables automatic adjustment of the attitude of a brim and consideration of sunlight irradiation information during reconfiguration of the attitude of the brim, and thereby achieves an effect that the attitude of a brim can be adjusted automatically for sunlight shielding.

In present embodiment, the mobile terminal acquires the setting parameter for the brim according to the configuration reference information, and then sends the setting parameter to the smart hat, so that the smart hat can reconfigure the attitude of the brim according to the setting parameter, and thus some relatively complicated processing and calculating operations are handed over to the mobile terminal, which enables full advantage to be taken of processing capacity of the mobile terminal and thereby reduces requirements for processing capacity of the smart hat.

The steps related to the mobile terminal in the above discussion may be separately implemented as a method of adjusting a brim at the side of the mobile terminal and the steps related to the smart hat may be implemented separately as a method of adjusting the brim at the side of the smart hat.

The following is an embodiment for device of the present disclosure, which may serve to implement embodiments for methods of the present disclosure. For details that are not disclosed in the embodiment for device, please refer to the embodiments for method of the present disclosure.

Figure 4:
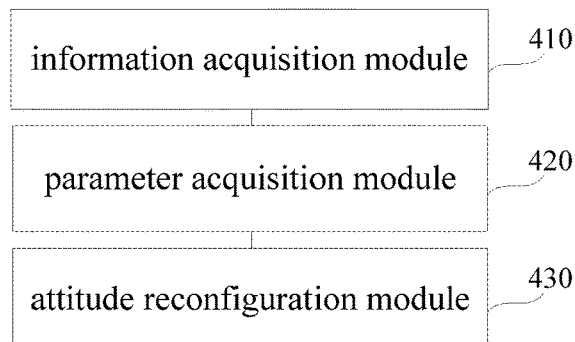
FIG. 4 is a block diagram illustrating a device of controlling a smart hat according to an exemplary embodiment.

FIG. 4 is a block diagram illustrating a device of controlling a smart hat according to an exemplary embodiment. The device has a functionality of realizing the above-described method, and the functionality can be implemented by hardware or by executing corresponding software by hardware. The device may include an information acquisition module 410, a parameter acquisition module 420, and an attitude reconfiguration module 430.

The information acquisition module 410 is configured to acquire configuration reference information of a brim of a smart hat. The configuration reference information may include attitude information of the brim on the smart hat and sunlight irradiation information.

The parameter acquisition module 420 is configured to acquiring setting parameter for the brim according to the configuration reference information.

The attitude reconfiguration module 430 is configured to reconfigure the attitude of the brim according to the setting parameter.

The device provided in the present embodiment, by acquiring configuration reference information of a brim of a smart hat, acquiring setting parameters according to the configuration reference information and reconfiguring the attitude of the brim according to the setting parameters, enables convenience for a user with no need to manually adjust the position of a brim, and furthermore, enables automatic adjustment of the attitude of a brim and consideration of sunlight irradiation information during reconfiguration of the attitude of the brim, and thereby achieves an effect that the attitude of a brim can be adjusted automatically for sunlight shielding.

Additionally or alternatively, the setting parameter includes at least one of the following items: a pitch attitude parameter and a horizontal attitude parameter.

In an example, the setting parameter includes the pitch attitude parameter. The attitude reconfiguration module 430 is configured to reconfigure the pitch attitude of the brim according to the pitch attitude parameter. The pitch attitude of the brim is reconfigured such that an angle between the plane of the brim and incident sunlight is with a first preset interval [90°−a, 90°], wherein 0≤a<90°.

Additionally or alternatively, the pitch attitude parameter includes one of the following items: a pitch direction parameter and a pitch angle parameter. The pitch direction parameter indicates an adjustment direction of the brim in pitch direction. The pitch angle parameter indicates an adjustment angle of the brim in pitch direction.

In another example, the setting parameter includes a horizontal attitude parameter. The attitude reconfiguration module 430 is configured to reconfigure horizontal attitude of the brim according to the horizontal attitude parameter. The horizontal attitude of the brim is reconfigured such that an angle between the plane of the brim and incident sunlight is within a second preset interval [90°−b, 90°], wherein 0≤b<90°.

Additionally or alternatively, the configuration reference information further includes: a user's attitude. The attitude of the brim is reconfigured such that the brim shields a target area of a user from the incident sunlight. The target area may include a combination of at least one of the following items: forehead, eyes, nose, mouth, ears, cheek, and neck.

Additionally or alternatively, the information acquisition module 410 is configured to acquire current geographical location and current time, and acquire sunlight irradiation information according to the current geographical location and the current time. The sunlight irradiation information may include at least one of the following items: sunlight irradiation angle, sunlight irradiation intensity, and sun's position.

It should be noted that the device provided in the present embodiment is exemplarily described with the functional modules for the functionalities, but in practice, the functionalities may be assigned to different functional modules according to practical requirements, i.e. structure of the device can be divided into different functional modules to implement all or part of the functionalities described above.

For the device in the above described embodiment, the specific manner of the operation in each module has been described in detail in the related embodiments for method, and will not be described in detail herein.

According to an exemplary embodiment of the present disclosure, there is provided another device for controlling a smart hat, which is capable of implementing the method of controlling a smart hat provided in the present disclosure. The device includes a processor and a memory for storing instructions executable by the processor. The processor is configured to: acquire configuration reference information of a brim of a smart hat, and the configuration reference information includes: attitude information of the brim on the smart hat and sunlight irradiation information; acquire setting parameter for the brim according to the configuration reference information; and reconfigure the attitude of the brim according to the setting parameter.

Additionally or alternatively, the setting parameter includes at least one of the following items: a pitch attitude parameter and a horizontal attitude parameter.

Additionally or alternatively, the setting parameter includes the pitch attitude parameter, and the processor is configured to: reconfigure the pitch attitude of the brim according to the pitch attitude parameter. The pitch attitude of the brim is reconfigured such that an angle between the plane of the brim and incident sunlight is within a first preset interval [90°−a, 90°], wherein 0≤b<90°.

Additionally or alternatively, the pitch attitude parameter includes one of the following items: a pitch direction parameter and a pitch angle parameter. The pitch direction parameter indicates an adjustment direction of the brim in pitch direction, and the pitch angle parameter indicates an adjustment angle of the brim in pitch direction.

Additionally or alternatively, the setting parameter includes a horizontal attitude parameter, and the processor is configured to: reconfigure horizontal attitude of the brim according to the horizontal attitude parameter. The horizontal attitude of the brim is reconfigured such that an angle between the plane of the brim and incident sunlight is within a second preset interval [90°−b, 90°], wherein 0≤b<90°.

Additionally or alternatively, the configuration reference information further may include: a user's attitude. The attitude of the brim is reconfigured such that the brim shields a target area of a user from the incident sunlight. The target area may include a combination of at least one of the following items: forehead, eyes, nose, mouth, ears, cheek, and neck.

Additionally or alternatively, the processor is configured to acquire current geographical location and current time, and acquire sunlight irradiation information according to the current geographical location and the current time. The sunlight irradiation information includes at least one of the following items: sunlight irradiation angle, sunlight irradiation intensity, and sun's position.

Figure 5:
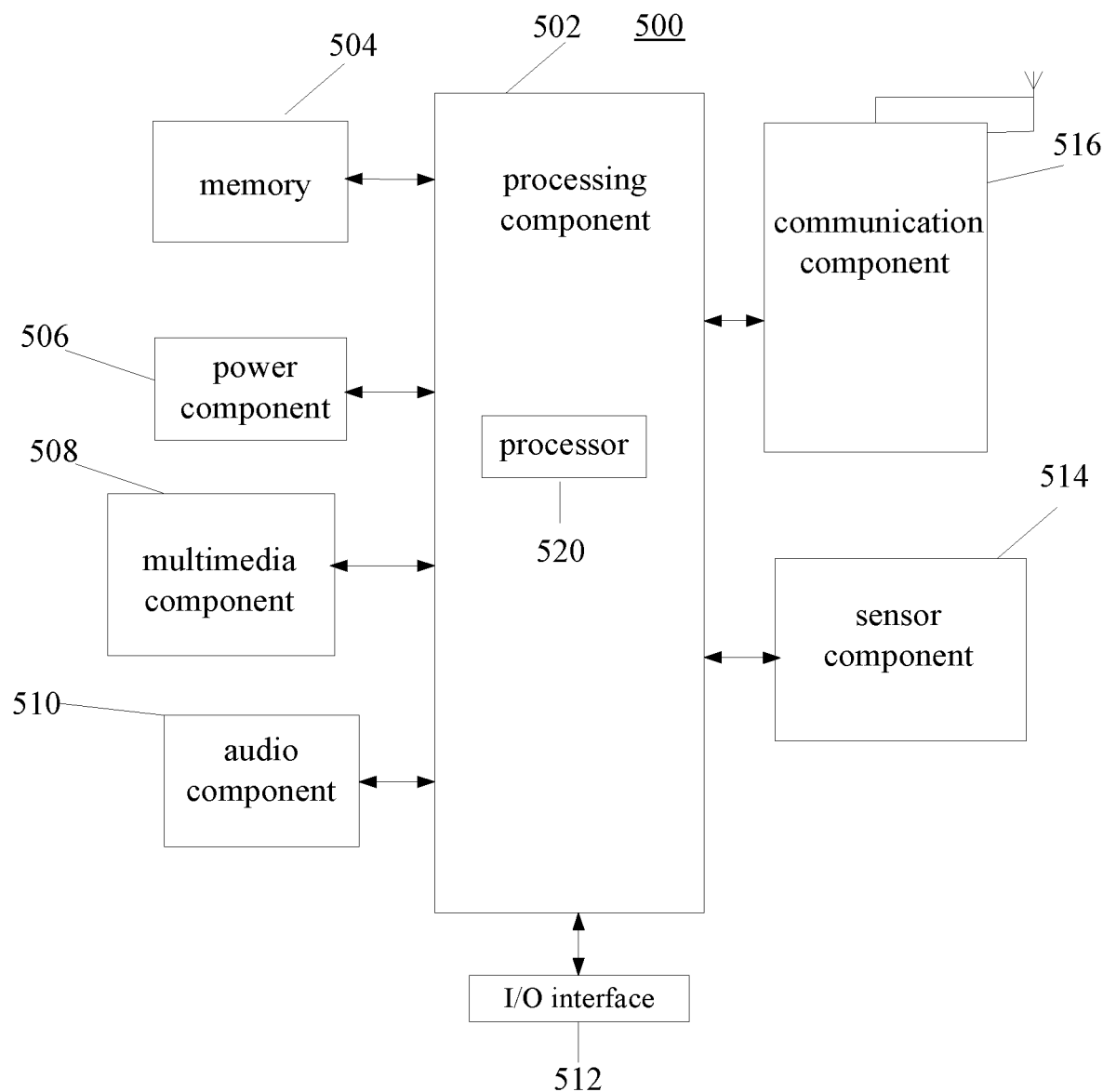
FIG. 5 is a block diagram of a device according to an exemplary embodiment.

FIG. 5 is a block diagram of a device 500 according to an exemplary embodiment. For example, the device 500 may be a mobile terminal, such as a cell phone, a tablet, a multimedia playing device, a PDA, or a wearable device.

Referring to FIG. 5, the device 500 may include one or more of the following components: a processing component 502, a memory 504, an actuator 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data may include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some embodiments, the multimedia component 508 includes a front camera and/or a rear camera. The front camera and/or the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a distance sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 504 including instructions executable by the processor 520 in the device 500 to perform the above-described methods. For example, the non-transitory computer-readable storage medium may be a ROM, a RAM, a CD-ROM, a magnetic tape, a floppy disc, an optical data storage device, and the like.

There is also provided a non-transitory computer-readable storage medium including instructions that, when executed by a processor of the device 500, enables the mobile terminal to perform the above-described method.

It should be understood that "plurality of" mentioned herein refers to two or more than two. "And/or", which describes association relationship between associated objects, indicates that there can be three types of relationships. For example, "A and/or B" can represent three cases: only A, A and B, and only B. The character "/" generally represents that the involved associated objects is in an OR relationship.

Other embodiments will be apparent to those skilled in the art from consideration of the specification and practice of the disclosure disclosed here. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for controlling a smart hat for wearing by a user, the smart hat comprising a brim, the method comprising:

acquiring, by a processor of the smart hat, configuration reference information of the brim, wherein the configuration reference information comprises information of the brim on the smart hat and information of sunlight, wherein the information of the sunlight comprises at least one of the following items: sunlight incident angle, sunlight intensity, and sun's position, and the information of the brim comprises at least one of the following items: information of an orientation of the brim in a pitch direction and information of an orientation of the brim in a horizontal direction;

acquiring, by the processor, a setting parameter for the brim according to the configuration reference information, wherein the setting parameter comprises at least one of the following items: a pitch parameter and a horizontal parameter; and reconfiguring, by the processor, the brim according to the setting parameter, wherein in the case that the setting parameter comprises the pitch parameter, reconfiguring the brim according to the setting parameter comprises:

reconfiguring an orientation of the brim in the pitch direction according to the pitch parameter such that an angle between a plane of the brim and incident sunlight is within a first preset interval [90°−a, 90°], wherein 0≤a<90°, wherein in the case that the setting parameter comprises the horizontal parameter, reconfiguring the brim according to the setting parameter comprises:

reconfiguring an orientation of the brim in the horizontal direction according to the horizontal parameter such that an angle between the plane of the brim and incident sunlight is within a second preset interval [90°−b, 90°], wherein 0≤b<90°.

2. The method of claim 1, wherein the pitch parameter comprises one of the following items:

a pitch direction parameter indicating an adjustment direction of the brim in the pitch direction; and a pitch angle parameter indicating an adjustment angle of the brim in the pitch direction.

3. The method of claim 1, wherein the configuration reference information further comprises information of the user wearing the smart hat, wherein the information of the user comprises at least an orientation of a head of the user in the pitch direction; and wherein reconfiguring the brim according to the setting parameter comprises:

reconfiguring the brim such that the brim shields a predetermined area of the user wearing the smart hat from the incident sunlight.

4. The method of claim 1, wherein acquiring configuration reference information of the brim comprises:

acquiring current geographical location at a current time sensed by a sensor, when the smart hat is wearing by the user; and acquiring the information of the sunlight according to the current geographical location at the current time.

5. A device for controlling a smart hat for wearing by a user, the smart hat comprising a brim, the device comprising:

a processor;

a storage for storing instructions executable by the processor;

wherein, the processor is configured to:

acquire configuration reference information of the brim, wherein the configuration reference information comprises information of the brim on the smart hat and information of sunlight, wherein the information of the sunlight comprises at least one of the following items: sunlight incident angle, sunlight intensity, and sun's position, and the information of the brim comprises at least one of the following items: information of an orientation of the brim in a pitch direction and information of an orientation of the brim in a horizontal direction;

acquire a setting parameter for the brim according to the configuration reference information, wherein the setting parameter comprises at least one of the following items: a pitch parameter and a horizontal parameter; and reconfigure the brim according to the setting parameter, wherein in the case that the setting parameter comprises the pitch parameter, the processor is configured to reconfigure an orientation of the brim in the pitch direction according to the pitch parameter such that an angle between the plane of the brim and incident sunlight is within a first preset interval [90°−a, 90°], wherein 0≤a<90°, wherein in the case that the setting parameter comprises a horizontal parameter, the processor is configured to reconfigure an orientation of the brim in the horizontal direction according to the horizontal parameter such that an angle between the plane of the brim and incident sunlight is within a second preset interval [90°−b, 90°], wherein 0≤b<90°.

6. The device of claim 5, wherein the pitch parameter comprises one of the following items:

the pitch direction parameter indicating an adjustment direction of the brim in the pitch direction; and a pitch angle parameter indicating an adjustment angle of the brim in the pitch direction.

7. The device of claim 5, wherein the configuration reference information further comprises information of the user wearing the smart hat, wherein the information of the attitude of the user comprises at least an orientation of a head of the user in the pitch direction; and wherein the processor is configured to reconfigure the brim such that the brim shields a predetermined area of the user wearing the smart hat from the incident sunlight.

8. The device of claim 5, wherein the processor configured to acquire configuration reference information of the brim is further configured to:

acquire current geographical location at a current time sensed by a sensor, when the smart hat is wearing by the user; and acquire the information of the sunlight according to the current geographical location at the current time.

9. A smart hat for wearing by a user, comprising:

a hat body, a brim movably connected with the hat body;

an actuator connected with the brim;

a processor; and a storage for storing instructions executable by the processor;

wherein the processor is configured to:

acquire configuration reference information of the brim, wherein the configuration reference information comprises information of the brim on the smart hat and information of sunlight, wherein the information of the sunlight comprises at least one of the following items: sunlight incident angle, sunlight intensity, and sun's position, and the information of the brim comprises at least one of the following items: information of an orientation of the brim in a pitch direction and information of an orientation of the brim in a horizontal direction;

acquire a setting parameter for the brim according to the configuration reference information, wherein the setting parameter comprises at least one of the following items: a pitch parameter and a horizontal parameter; and reconfigure the brim according to the setting parameter, wherein in the case that the setting parameter comprises the pitch parameter, the processor is configured to reconfigure an orientation of the brim in the pitch direction according to the pitch parameter such that an angle between the plane of the brim and incident sunlight is within a first preset interval [90°−a, 90°], wherein 0≤a<90%, wherein in the case that the setting parameter comprises a horizontal parameter, the processor is configured to reconfigure an orientation of the brim in the horizontal direction according to the horizontal parameter such that an angle between the plane of the brim and incident sunlight is within a second preset interval [90°−b, 90°], wherein 0≤b<90°, and wherein the processor is further configured to control the actuator to adjust the the brim.

10. The smart hat of claim 9, wherein the brim comprises connection parts on both sides of the brim;

wherein the hat body comprises fixing parts on both sides of the hat body, the fixing parts being movably connected with the connection parts, respectively to form movable connection points on both sides of the brim; and wherein the brim is rotatable about an axis formed by the movable connection points in the pitch direction.

11. The smart hat of claim 10, wherein the hat body comprises a sliding member on a peripheral edge, and the fixing parts are located on the sliding member respectively and movably connected with the sliding member; and wherein the brim is rotatable in a plane of the brim along the sliding member.

12. The smart hat of claim 9, further comprising:

a communication interface electrically connected to the processor, wherein the communication interface is configured to establish a communication connection with an external device, and exchange information with the external device through the communication connection.

13. The smart hat of claim 9, further comprising:

a sensor electrically connected to the processor, wherein the sensor comprises:

a positioning sensor configured to acquire current geographical location;

a photosensor configured to acquire sunlight incident angle and/or sunlight intensity; and a geomagnetism sensor configured to acquire information of the user wearing the smart hat and/or the information of the brim.

* * * * *